US010046812B2

(12) United States Patent
Schmalzl et al.

(10) Patent No.: US 10,046,812 B2
(45) Date of Patent: Aug. 14, 2018

(54) INDUSTRIAL TRUCK

(71) Applicant: Jungheinrich Aktiengesellschaft, Hamburg (DE)

(72) Inventors: Jürgen Schmalzl, Haimhausen (DE); Carsten Schöttke, Moosburg (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 239 days.

(21) Appl. No.: 15/002,536

(22) Filed: Jan. 21, 2016

(65) Prior Publication Data
US 2016/0214659 A1    Jul. 28, 2016

(30) Foreign Application Priority Data

Jan. 22, 2015   (DE) .................. 10 2015 201 098
Jun. 18, 2015   (DE) .................. 20 2015 004 375 U

(51) Int. Cl.
*B62D 33/073*   (2006.01)
*B66F 9/075*    (2006.01)
(Continued)

(52) U.S. Cl.
CPC ....... *B62D 33/073* (2013.01); *B62D 33/0636* (2013.01); *B66F 9/0759* (2013.01); *B66F 9/07559* (2013.01); *B66F 9/148* (2013.01)

(58) Field of Classification Search
CPC .......... B66F 9/146; B66F 9/147; B66F 9/148; B66F 9/20; B66F 9/22; B66F 9/07559;
(Continued)

(56) References Cited

U.S. PATENT DOCUMENTS

| 4,365,921 A | * | 12/1982 | Brouwer | ................... B66F 9/06 187/234 |
| 5,112,183 A | * | 5/1992 | Nusbaum | ............... B62D 7/026 180/234 |
| 8,944,744 B2 | * | 2/2015 | Kleeberger | ......... B66F 9/07545 187/222 |

FOREIGN PATENT DOCUMENTS

| DE | 10005318 | 8/2001 |
| EP | 0881191 | 12/1998 |
| EP | 2368832 | 6/2013 |

OTHER PUBLICATIONS

DE10 2015 201 098.8 , German Application No. DE10 2015 201 098.8, "Search Report" dated Dec. 15, 2015.
(Continued)

*Primary Examiner* — Glenn F Myers
(74) *Attorney, Agent, or Firm* — Kilpatrick Townsend & Stockton LLP

(57) ABSTRACT

An industrial truck is proposed comprising:
a lifting frame;
an operator compartment which can be moved upwards and downwards;
a lateral push frame, arranged on the operator compartment, in the front thereof, and which can be moved upwards and downwards together with the operator compartment and carries a load-receiving device, which can be moved back and forth; and
a vibration-damping means, which can be moved upwards and downwards, for damping vibrations. The vibration-damping means being arranged between the operator compartment and the load-receiving device, is designed to make vibration compensation movements of the load-receiving device relative to the operator compartment possible. Preferably, an over-reach device is provided, combined with the vibration-damping means,
(Continued)

for moving the lateral push frame to the straight forward travel direction of the industrial truck and relative to the operator compartment, so as to increase the lateral movement range of the load-receiving device relative to the operator compartment.

20 Claims, 3 Drawing Sheets

(51) Int. Cl.
*B66F 9/14* (2006.01)
*B62D 33/063* (2006.01)

(58) Field of Classification Search
CPC . B66F 9/0759; F16F 2232/08; F16F 2230/18; F16F 2230/12; B62D 33/0608; B62D 33/0636; B62D 33/073
See application file for complete search history.

(56) References Cited

OTHER PUBLICATIONS

European Application No. 16 150 189.5, Extended European Search Report dated Jun. 15, 2016.

* cited by examiner

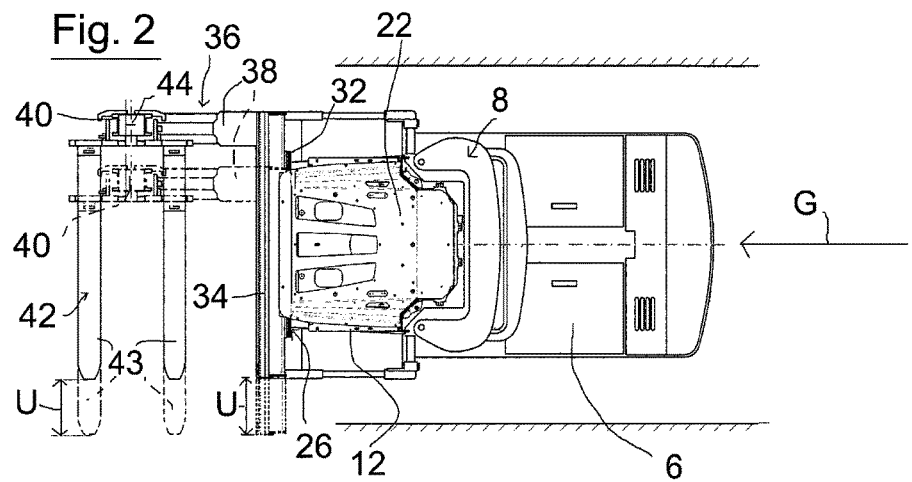
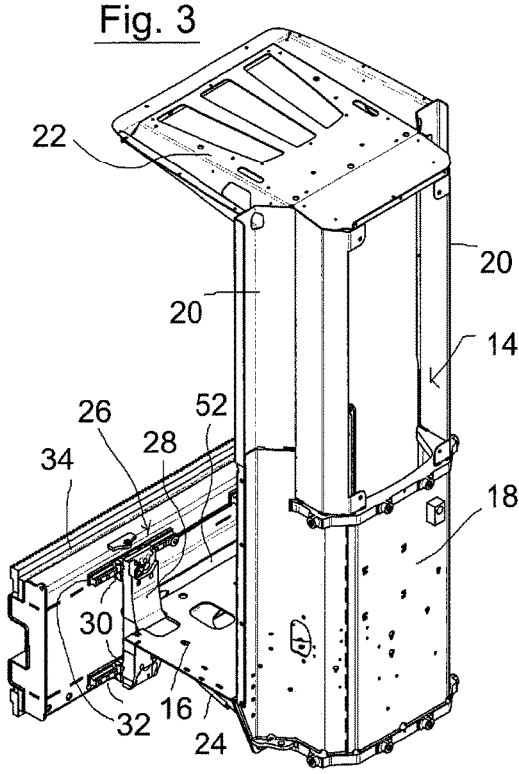
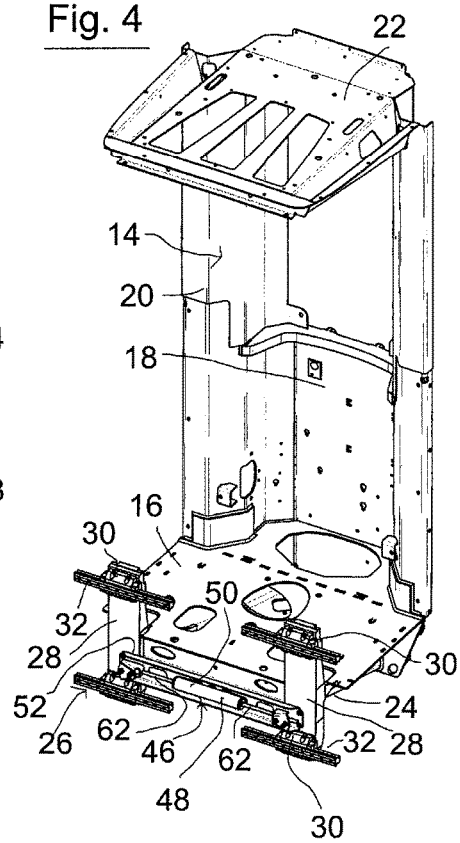

INDUSTRIAL TRUCK

CROSS REFERENCE TO RELATED APPLICATION

This application claims priority to German application no. 10 2015 201 098.8 filed Jan. 22, 2015 and to German application no. 20 2015 004 375.5 filed Jun. 18, 2015, the disclosures of which are hereby incorporated by reference herein in their entireties.

The invention relates to an industrial truck comprising
a lifting frame
an operator compartment which can be moved upwards and downwards on the lifting frame,
a lateral push frame, which is arranged on the operator compartment, preferably in the front thereof, and which can be moved upwards and downwards on the lifting frame together with the operator compartment and carries a load-receiving device, which can be moved back and forth laterally transversely to the straight forward travel direction of the industrial truck, and
a vibration-damping means, which can be moved upwards and downwards on the lifting frame together with the operator compartment, for damping vibrations.

Industrial trucks of this type are also referred to as turret trucks, and in a common construction thereof as three-sided turret trucks. They are often used as high-rack stacker trucks. By means thereof, the stacking and unstacking of whole pallets can be combined effortlessly with the picking of orders from high racks. Since the operator compartment, conventionally formed as a cabin or operator platform, is vertically displaceable along with an operator located therein, together with the load-receiving device, on the lifting frame, industrial trucks of this type are also known as man-up vehicles or man-up industrial trucks. In various constructions of man-up industrial trucks, the lifting frame can be extended and retracted telescopically, the operator compartment being fixed in a height adjustable manner to the highest extensible telescope portion of the lifting frame.

The load-receiving device, which is guided movably on the lateral push frame, may comprise an additional lifting frame having load-receiving means which are movable upwards and downwards thereon relative to the operator platform and which are usually in the form of a load-bearing fork. The additional lifting frame is arranged on a swivel reach apparatus and is pivotable thereon through for example approximately 180° about a usually vertical axis, and therefore the load-bearing fork, which is fixed in a height adjustable manner to the additional lifting frame, can be pivoted from a position orientated laterally transversely to the straight forward travel direction of the industrial truck into a position having the opposite lateral orientation. The swivel reach apparatus is usually guided linearly on the lateral push frame.

A typical task for the industrial truck is for example to store a pallet having a load located thereon in a rack, the industrial truck being located in a narrow aisle between racks of a high-rack warehouse and the pallet being received on the load-bearing fork. The pallet is inserted into the rack laterally transversely to the straight forward travel direction of the industrial truck, it being assumed that the load-bearing fork is already orientated correctly towards the desired storage space, laterally towards the rack, and that the swivel reach apparatus along with the additional lifting frame provided thereon is located in a lateral final position at the end of the lateral push frame remote from the rack in question. By displacing the swivel reach apparatus linearly laterally along the lateral push frame, the loaded pallet can subsequently be introduced into the rack. In previously known three-sided stackers of the type under consideration, the stacking depth, in other words the degree of lateral displacement of the load bearing fork relative to the lifting frame or the operator platform, is limited by the displacement path of the swivel reach apparatus on the lateral push frame, and thus by the width dimension of the lateral push frame. The width dimension of the lateral push frame is in turn limited by the maximum acceptable width of the industrial truck. For narrow-aisle stackers, the maximum acceptable width of the industrial truck is comparatively small.

The applicant is pursuing a novel principle for increasing the size of the maximum lateral displacement of the load-bearing fork relative to the lifting frame, known as the "over-reach principle". According to this principle, an over-reach device for moving the lateral push frame laterally relative to the operator compartment is provided, the over-reach device having a lateral push frame guide, which holds the lateral push frame on the operator compartment movably laterally transversely to the straight forward travel direction of the industrial truck, and a controllable adjustment means, which is designed to move the lateral push frame along the lateral push frame guide relative to the operator compartment, so as to increase the lateral movement range of the load-receiving device relative to the operator compartment. The over-reach device thus makes it possible to displace the lateral push frame laterally horizontally relative to the operator platform, the load-receiving device additionally being movable laterally on and relative to the lateral push frame. The load-receiving device can thus perform a lateral telescoping movement so as to achieve a greater stacking depth than was possible previously in industrial trucks of the type under consideration.

Various controllable drive means are provided for driving the various movable components on the lifting frame. Depending on the setup of the industrial truck, they are used for moving the load-receiving means on the additional lifting frame, for pivoting the additional lifting frame about a vertical axis, for moving the load-receiving device or the swivel reach apparatus on the lateral push frame, for moving the operator platform on the lifting frame and possibly for telescopically extending and retracting the lifting frame and for moving the lateral push frame relative to the operator platform. Preferably, they are hydraulic drive means.

It is a known problem that, in industrial trucks of the type under consideration, vibrations occur in the lifting frame, in particular vibrations having vibration components directed laterally, in other words transversely, to the straight forward travel direction of the industrial truck, in particular during travel over an uneven travel surface. The higher the operator platform and the advancement apparatuses thereof are lifted on the lifting frame, and the larger the load, if any, received and lifted by means of the load-receiving device, the stronger these vibrations often become. Vibratory movements of this type may be unpleasant for an operator located at the operator platform, and make it difficult or sometimes even impossible to store pallets in and remove pallets out of racks, meaning that the operator can safely initiate a storing or removal process only when the vibrations have diminished while the industrial truck is stationary. Alternatively, the operator could drive the industrial truck at a reduced speed when travelling on uneven ground so as to avoid inciting vibrations. However, both possibilities would reduce the productivity of the industrial truck.

EP 2 368 832 B1 discloses an industrial truck of the type mentioned at the outset in the form of a man-up vehicle, in which vibration reduction measures have already been taken. These measures consist in an assembly, which is referred to as a load-receiving portion, can be moved up and down on the lifting frame, and comprises the operator compartment and the load-receiving device interconnected thereto, being attached to the lifting frame in such a way that said assembly as a whole can perform movements having a lateral, in other words normally horizontal, movement component relative to the lifting frame, transversely to the forward travel direction (primary travel direction) of the industrial truck, a separate degree of freedom of movement, not provided for the routine operation of the industrial truck, being designed for the assembly. The known industrial truck comprises means for damping or preventing vibrations in the relative position between the load-receiving portion and the lifting frame, in other words between the operator platform (operator compartment) and the lifting frame. These may be active, semi-active and/or passive vibration-damping means, which are suitable for generating a force or a torque between the lifting frame and the load-receiving portion, which force or torque has a component along the separate degree of freedom of movement not provided for the routine operation of the industrial truck. In EP 2 368 832 B1, to reduce vibration, damping elements and springs inter alia are proposed, which counter a deflection of the lifting frame and of the assembly referred to as the load-receiving portion along the separate degree of freedom of movement. A drawback of this known solution is a relatively high installation expense in order to attach to the lifting frame the complete assembly, consisting of the operator platform and all of the load-receiving components which are vertically displaceable on the lifting frame together therewith, while establishing the separate degree of freedom of movement not provided for the routine operation of the industrial truck. Retrofitting an industrial truck of this type with these known vibration-reducing measures would also end up being complicated and expensive.

The object of the invention is to provide an industrial truck of the type mentioned at the outset which is fitted with vibration-reducing measures which are relatively simple to achieve in terms of installation, and which makes efficient vibration-reducing operation possible whilst having very little effect on the comfort of an operator occupying the operator compartment.

Another aspect of the object of the invention is to equip an industrial truck of the type mentioned at the outset with expanded operation functions, and to take vibration-damping measures in connection with the expanded operating functions.

According to the invention, an industrial truck having the features of claim 1 is proposed, specifically an industrial truck of the type mentioned at the outset which is characterised in that the vibration-damping means is arranged functionally between the operator compartment and the load-receiving device and is designed to make vibration compensation movements of the load-receiving device relative to the operator compartment possible so as to damp or suppress vibrations.

Tests have shown that the particular selection according to the invention of the operative location of the vibration-damping device between the operator compartment and the load-receiving device brings about a number of advantages. Unlike the known industrial truck of EP 2 368 832 B1, in which the vibration-damping means is arranged functionally between the lifting frame and the operator compartment and the operator compartment is thus also involved in the vibration compensation movements, according to the present invention the operator compartment is coupled to the lifting frame more rigidly relative to lateral movements, the load-receiving device being able to perform vibration compensation movements relative to the operator compartment and the lifting frame. Thus, by contrast with the situation according to the prior art, an operator located at the operator compartment is not directly involved in the relevant vibration compensation movements of the load-receiving device, and this leads to greater comfort for an operator occupying the operator compartment. When vibrations are incited in the industrial truck, the operator feels basically only the vibratory movements (damped by the vibration-damping means) of the lifting frame, and can therefore better estimate the vibration state of the whole system of the industrial truck from his position in the operator compartment, so as to be able to determine more quickly whether vibrations have diminished sufficiently and a stacking process or unstacking process can be initiated or if applicable continued.

Tests have further shown that the vibration-damping behaviour of an industrial truck equipped in accordance with the invention are highly favourable over a wide range of different lifting heights and loads of different weights on the load-receiving device, meaning that vibrations can be damped rapidly.

The vibration-damping device is preferably attached to a carrier or carrying frame, which is movable vertically on the lifting frame, of the operator compartment in the front thereof.

In a particularly preferred embodiment of the invention, the vibration-damping means is arranged between the operator compartment and the lateral push frame thereof, and designed to make shared vibration compensation movements of the load-receiving device and the lateral push frame relative to the operator compartment possible so as to damp or suppress vibrations.

According to a variant of the invention, a lateral push frame guide, on which the lateral push frame is movably guided so as to perform vibration compensation movements having a movement component laterally transversely to the straight forward travel direction of the industrial truck and relative to the operator compartment, is provided on the operator compartment or on a carrier or carrying frame of the operator compartment.

In a further embodiment of the invention, the vibration-damping device comprises at least one resilient return element in a connection between the load-receiving device and the operator compartment, preferably between the lateral push frame and the operator compartment, which element is arranged in such a way that it can counter vibratory deflections of the load-receiving device and/or of the lateral push frame relative to the operator compartment.

Expediently, the vibration-damping means should also comprise at least one for example hydraulic, pneumatic, hydropneumatic or electromagnetic shock absorber element in a connection between the load-receiving device and the operator compartment, preferably between the lateral push frame and the operator compartment. In a preferred embodiment of the invention, the shock absorber element is in the form of a cylinder, for example a synchronised cylinder, which comprises, in a cylinder housing, two cylinder chambers which are separated by a piston movable in said housing and which contain a fluid and are interconnected via a throttle point.

One embodiment of the invention is characterised in that the vibration-damping means comprises at least one active hydraulic, pneumatic, hydropneumatic or electromotive vibration-damping member which can be controlled by means of a control means, the active vibration-damping member preferably being controlled on the basis of signals from vibration sensors which may be provided at different points in the industrial truck, in particular on the lifting frame.

In an aspect of the invention which is to be emphasised in particular, the industrial truck has expanded operating functions by comparison with the prior art, means provided for this purpose also serving as components of the vibration-damping means. These expanded operating functions relate to increasing the lateral movement range of the load-receiving device relative to the operator compartment. For this purpose, in a particularly preferred embodiment, the industrial truck according to the invention comprises an over-reach device for controlled lateral positioning of the lateral push frame transversely to the forward travel direction of the industrial truck and relative to the operator compartment. The over-reach device comprises the lateral push frame guide and a controllable adjustment device for moving the lateral push frame along the lateral push frame guide, the vibration-damping means being integrated into the over-reach device.

The over-reach device thus comprises the lateral push frame guide, which holds the lateral push frame on the operator compartment movably laterally transversely to the straight forward travel direction of the industrial truck, and a controllable adjustment means, which is designed to move the lateral push frame along the lateral push frame guide relative to the operator compartment, so as to increase the lateral movement range of the load-receiving device relative to the operator compartment. In particular variants of the invention, both the lateral push frame guide and the controllable adjustment means may be used as components of the vibration-damping means. In a vibration-damping mode, the vibration-damping means makes vibration compensation movements of the lateral push frame along the lateral push frame guide relative to the operator compartment possible so as to damp or suppress vibrations.

During test operation of an industrial truck according to the invention equipped in this manner, it has been found that the vibration-damping effect of the proposed measures is very good. By contrast with the man-up industrial truck known from EP 2 368 832 B1, in the industrial truck according to the invention, instead of the entire operator platform being attached to the lifting frame so as to be movable laterally transversely to the straight forward travel direction, merely the lateral push frame is attached to the operator compartment so as to be movable laterally transversely to the forward travel direction of the industrial truck, so as to be able to counter vibrations, the operator compartment, usually in the form of a cabin or operator platform, being mounted on the lifting frame so as to be movable up and down. It should be emphasised that no separate degree of freedom of movement is to be provided for the vibration compensation movements of the lateral push frame and the components connected thereto of the load-receiving device, since the routine degree of freedom of movement of the lateral over-reach of the over-reach device is also used for the vibration compensation movements.

In a preferred embodiment of the invention, the adjustment device of the over-reach device comprises an adjustment member which can be controlled by means of a control means of the industrial truck, specifically a hydraulic adjustment member and/or an electromotive adjustment member and/or a hydropneumatic and/or pneumatic adjustment member, as drive means for moving the lateral push frame relative to the lateral push frame guide. Preferably, a hydraulic adjustment member is used, since in most cases an on-board hydraulic system is already provided, so as to be able to perform lifting functions of the lifting frame and if applicable of the additional lifting frame as well as push movements and pivot movements of the load-receiving device by means of hydraulic drives.

In a particularly preferred embodiment of the invention, the adjusting means comprises a double-action hydraulic synchronised cylinder as a controllable adjustment member between the operator compartment and the lateral push frame, the synchronised cylinder comprising, in a cylinder housing, two cylinder chambers which are separated by a piston movable in said housing and which have at least one hydraulic connection in each case for supplying and removing hydraulic fluid. The cylinder housing is expediently fixed to the operator compartment, or to an operator compartment carrier arranged so as to be height adjustable on the lifting frame, at the front, whilst two piston rods protruding from the opposite ends of the piston are connected, at the outer piston rod ends thereof, to the lateral push frame. The reverse situation, where the piston rods are fixed to the operator platform and the cylinder housing is fixed to the lateral push frame, would also be conceivable. The double-action synchronised cylinder may be used as a passive damping element if the cylinder chambers thereof are interconnected via at least one hydraulic throttle point and if said cylinder is additionally preferably isolated from hydraulic sources and hydraulic sinks. Because of the equally large piston areas on the two piston ends, in the case of a hydraulic short-circuit or bypass-connection of this type the synchronised cylinder behaves symmetrically in terms of the force-pressure conversion and thus also in terms of the damping behaviour in relation to force action from the opposite piston rod ends. Preferably, the hydraulic synchronised cylinder is connected to a control valve arrangement which is adjustable in such a way that it interconnects the cylinder chambers of the synchronised cylinder externally via the hydraulic connections to set a vibration-damping mode. Alternatively or in addition, a cylinder-internal short-circuit connection between the two cylinder chambers which can be closed and opened in a controllable manner would also be conceivable. In both cases, the synchronised cylinder may have a double function, specifically both that of the adjustment member of the over-reach device and that of the damping cylinder for damping vibrations.

As a further passive vibration-damping measure, in a development of the invention at least one resilient return element is arranged in a connection between the lateral push frame and the operator platform in such a way that said element can counter vibratory deflections of the lateral push frame relative to the lateral push frame guide. Mechanical metal springs of various constructions are conceivable as resilient return elements. Rubbery-elastic buffer elements may also be used as vibration return elements in the context of the invention. In a variant of the invention, a resilient return element of this type is arranged in a connection between the lateral push frame and the adjustment means and/or in a connection between the adjustment means and the operator compartment, in each case in series, in such a way that said element can counter vibratory deflections of the lateral push frame relative to the operator compartment. An arrangement of this type provides symmetrical return behaviour irrespective of the particular desired adjustment position of the lateral push frame relative to the lateral push frame guide and to the operator platform.

In a further preferred embodiment of the invention, at least one sensor is provided for detecting vibrations in particular of the lateral push frame, the sensor being in a data transfer connection with the control means for controlling the adjustment member of the over-reach device, and the control means being set up, in the vibration-damping mode, to control the adjustment member of the over-reach device on the basis of the measurement information from the at least one sensor in such a way that said adjustment member performs adjustment movements which counter any vibrations of the lateral push frame. This is thus an active variant of the addressed vibration damping or vibration suppression. In this case too, the synchronised cylinder has a double function, specifically both as an adjustment member of the over-reach device and as an active actuator for damping vibrations.

Various sensors are conceivable for detecting vibrations, for example strain gauges, piezoelectric elements, fluid pressure sensors, acceleration sensors and/or distance sensors, such as inductive distance sensors, which for example detect movements between the lateral push frame and the lateral push frame guide or the operator platform. Strain gauges, in particular piezoelectric elements, may be used to measure resilient deformations of the lifting frame or other components which display easily measurable deformations in the case of vibrations. Fluid pressure sensors can be inserted into the hydraulic circuit of the industrial truck to detect pressure fluctuations which indicate vibrations of the lifting frame and components arranged thereon.

In the context of the present invention, preferably at least one sensor should be arranged and set up so as to detect changes in position of the lateral push frame relative to the lateral push frame guide or to the operator platform, so as to provide information for controlling the adjustment member in the function thereof as an active vibration-damping element.

Preferably, a plurality of sensors are in data transfer connection with the control means of the adjustment member of the over-reach device, the control means being set up, in the vibration-damping mode, to control the adjustment member on the basis of the measurement information from at least some of the sensors in such a way that said member performs adjusting movements which counter any vibrations of the lateral push frame, the sensors providing information concerning resilient material strains of the lifting frame and/or vibrations of the load-receiving device relative to the lateral push frame and/or the current travel speed of the industrial truck and/or the lifting height of the operator platform and/or the lifting height of load-receiving means of the load-receiving device relative to the operator platform and/or the mass of the load carried by the load-receiving device.

In the following, the invention is described in greater detail by way of an embodiment, with reference to the drawings.

FIG. 2 is a plan view of the industrial truck of FIG. 1.

FIG. 3 is a perspective view, from diagonally behind, of the isolated frame of the operator compartment of the industrial truck of FIG. 1 and FIG. 2, together with the lateral push frame guide attached thereto and the lateral push frame arranged on the lateral push frame guide.

FIG. 4 is a perspective view, from diagonally in front, of the frame of the operator compartment of FIG. 3 together with the lateral push frame guide attached thereto and an adjustment means of the over-reach device.

Figure 1:
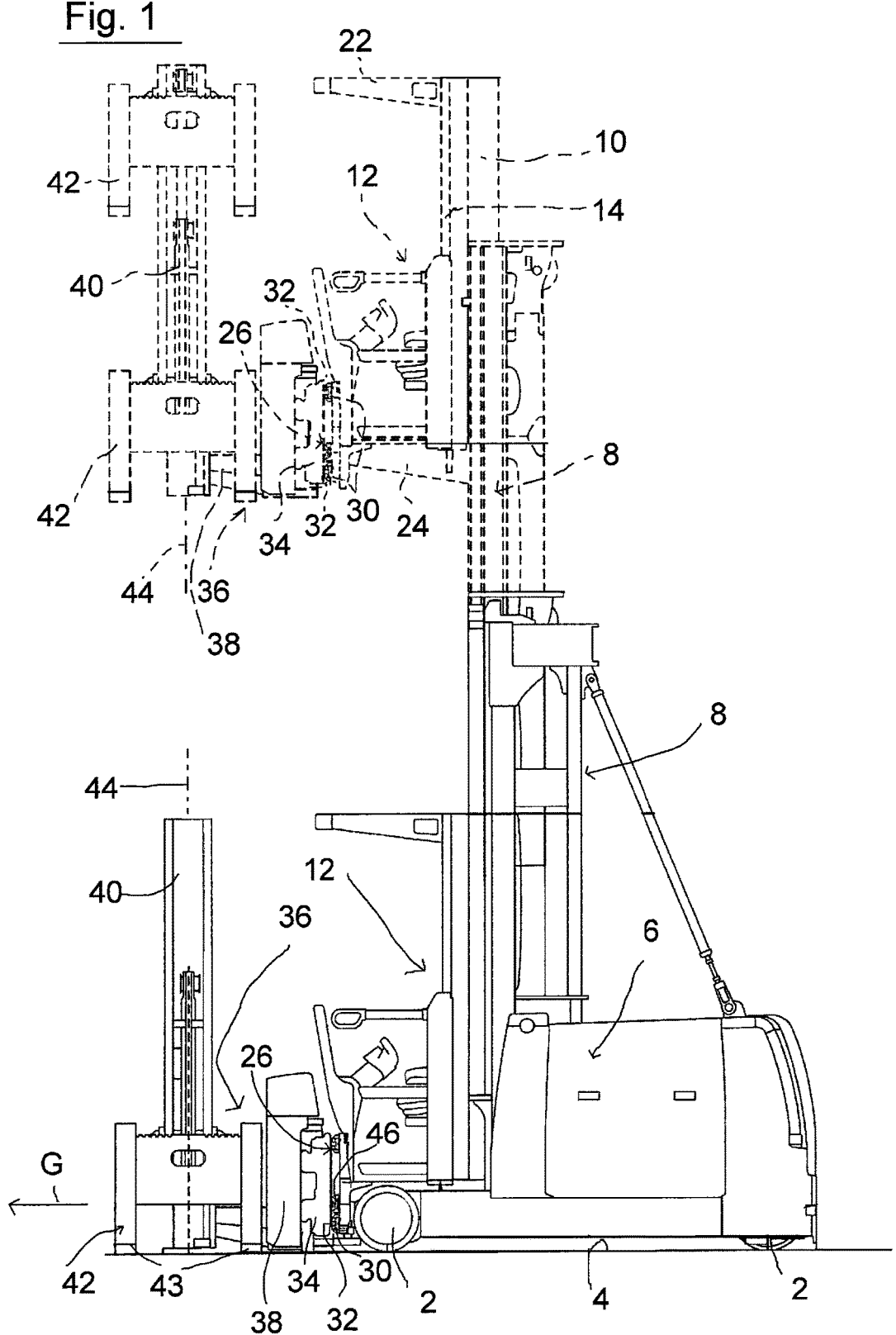
FIG. 1 is a side view of an embodiment of an industrial truck according to the invention.

According to FIG. 1, the industrial truck comprises a chassis 6 supported on the travel surface 4 via wheels 2 and a lifting frame 8 fixed upright on the chassis 6. The lifting frame 8 is formed so as to be telescopically extensible in multiple parts, as can be seen in FIG. 1 from the extended position shown in dashed lines. An operator compartment 12 is vertically displaceably attached to telescope segment 10 which is extensible furthest of the lifting frame 8. The operator compartment 12 is configured as a liftable operator cabin, which comprises a frame 14, shown in FIG. 3 and FIG. 4, having a cabin floor 16, a rear wall 18, sides 20 and an operator protection roof 22. In the front of the operator compartment 12, a lateral push frame guide 26 is fixed to frame floor supports 24, and in the example is formed from two stationary vertical crosspieces 28, which at the ends thereof comprise guide profiles 30 and holding rails 32 longitudinally displaceable therein for the lateral push frame 34. The arrangement of the lateral push frame 34 on the lateral push frame guide 26 can be seen in FIG. 3. FIG. 4 shows the lateral push frame guide 26 without the lateral push frame 34.

The lateral push frame guide 26 makes a laterally horizontal displacement of the lateral push frame 34 possible in a plane transverse to the straight forward travel direction G of the industrial vehicle, as is shown using dashed lines in FIG. 2. A load-receiving device 36 known per se is arranged on the lateral push frame 34 displaceably laterally transversely to the straight forward travel direction G of the industrial truck. It comprises a swivel reach apparatus 38, displaceable on the lateral push frame 34 and having an additional lifting frame 40 arranged thereon at the front, on which a load-bearing fork 42 is vertically displaceable as the load-receiving means. The additional lifting frame 40 is pivotable together with the load-bearing fork 42 about the vertical axis 44 between the position shown clearly in FIG. 2, having a lateral orientation of the load-bearing fork 42 (to the left in relation to the straight forward travel direction G), and a position having an opposite lateral orientation of the load-bearing fork 42.

A characteristic which should be emphasised of this embodiment of an industrial truck according to the invention is the over-reach device for lateral movement of the lateral push frame 34. The over-reach device comprises the lateral push frame guide 26 and a controllable adjusting means 46 for moving the lateral push frame 34 along the lateral push frame guide 26, in other words in the longitudinal direction of the rails 32. As an adjustment member, the adjusting means 46 comprises a hydraulic synchronised cylinder 48, the cylinder housing 50 of which is fixed, stationary with respect to the operator compartment frame, to a holding plate 52, which extends between and is fixed to the crosspieces 28.

Piston rods 62 protrude outwards on both sides from the piston 60 (cf. FIG. 5-FIG. 8) which is displaceably received in the cylinder housing 50, and these piston rods 62 are connected at the outer ends thereof to the lateral push frame 34. The two cylinder chambers 64 of the synchronised cylinder 48, which are separated by the piston 60, are connected via hydraulic connections 66, 68 to a hydraulic control valve arrangement 70a; . . . ; 70c and are to be connected alternately to a hydraulic source (pump) 72 or to a hydraulic sink (tank) 74 by appropriately actuating the hydraulic control valve arrangement 70a; . . . ; 70c, so as to displace, in a desired manner, the piston 60 and the lateral push frame 34 connected thereto via the piston rods 62. In this way, the lateral push frame 34 together with the load-receiving device 36 can be displaced along the lateral push frame guide 26 by a particular amount from a neutral position, shown in solid lines in FIG. 2, into an over-reach position, shown in dashed lines in FIG. 2, by means of the controllable adjusting means 46 and the synchronised cylinder 48 thereof. An over-reach of this type of the lateral push frame 34 is possible on both sides of the neutral position. It is thus possible to displace the load-bearing fork 42 together with the fork prongs 43 thereof further laterally, by the over-reach amount U, than was previously the case in known industrial trucks of the type mentioned at the outset. Starting from the position in FIG. 2, the load-bearing fork shown in dashed lines can additionally still be displaced laterally to the left in relation to the straight forward direction G by virtually the entire length of the lateral push frame 34, and therefore, because of the telescoping effect from over-reaching of the lateral push frame 34 and lateral pushing of the swivel reach apparatus 38 on the lateral push frame 34, an increased stacking depth can be achieved using the load-bearing fork 42.

According to a particular aspect of the invention, the degree of freedom of movement, used for the over-reach, of the lateral push frame 34 relative to the lateral push frame guide 26 is also used as the degree of freedom of movement for vibration compensation movements for the purpose of damping vibrations. In the shown embodiment of the invention, the principle according to the invention is achieved by providing the vibration-damping means between the operator compartment 12 and the load-receiving device 36. In the configuration disclosed with reference to FIG. 1-4, there are various options for selecting and using vibration-damping means. Some of these are explained in the following with reference to the schematic diagrams of FIG. 5-8.

Figure 5:
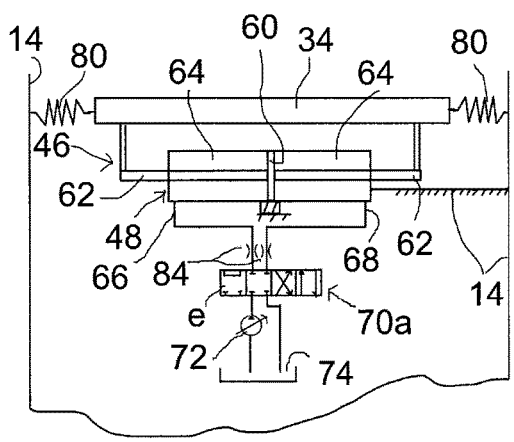
FIG. 5-FIG. 8 are highly simplified schematic drawings of various variants of passive vibration-damping measures.

In the passive vibration-damping variant of FIG. 5, the lateral push frame 34 is coupled to the operator compartment frame 14 by means of springs 80. Furthermore, the control valve arrangement 70a can be controlled in such a way (valve portion e switched on) that the hydraulic connections 66, 68 of the synchronised cylinder 48 are interconnected via the throttle points 84 and the cylinder chambers 64 are thus short-circuited via the throttle points 84. The synchronised cylinder 48 thus operates as a passive damping cylinder by way of the throttle points 84. If vibrations occur in the lifting frame or the advancement parts arranged thereon, the lateral push frame 34 can perform compensation movements laterally transversely to the straight forward travel direction G according to the damping effect of the compensation cylinder 48 and the springs 80 so as to damp or suppress the vibrations. If the lateral push frame is spring-coupled to the operator compartment frame 14 in the manner shown in FIG. 5-7, vibratory deflections are damped symmetrically only if the lateral push frame 34 is basically in the neutral position and the vibratory deflections are taking place about the neutral position, in other words if aside from the vibratory deflections the piston 60 is adjusted basically in the centre of the synchronised cylinder 48 and the two springs 80 are alternately loaded in a comparable manner by successive vibratory deflections. However, a vibration-damping effect still takes place if the vibration-damping mode is set while the piston 60 is displaced out of the cylinder centre by switching on the valve portion e and a short circuit or bypass connection of the two cylinder chambers 64 is thus produced by way of the throttle points 84.

Figure 6:
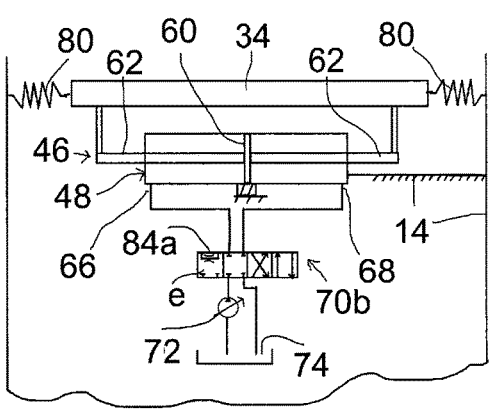

The variant of FIG. 6 corresponds substantially to the variant of FIG. 5, in FIG. 6 the throttle points 84 in the connecting lines between the valve arrangement 70a and the synchronised cylinder 48 being replaced with a throttle point 84a in the bypass connection branch of the valve portion e. In FIG. 5-8, like components are denoted by correspondingly like reference numerals. The mode of operation of the arrangement of FIG. 6 corresponds to the mode of operation of the arrangement of FIG. 5.

Figure 7:
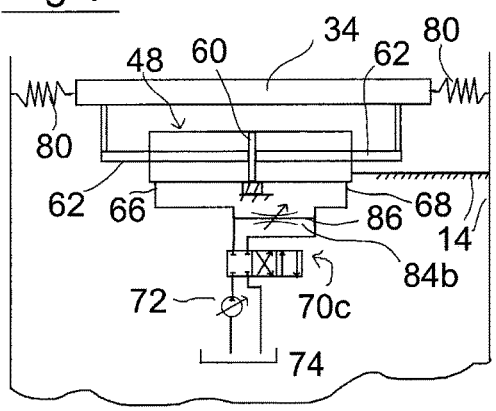

In the variant of FIG. 7, instead of the throttle points 84 (FIG. 5) and 84a (FIG. 6), an adjustable throttle 84b is provided in a separate bypass connection line 86 which interconnects the hydraulic connections 66, 68. By adjusting the aperture cross section of the adjustable throttle 84b, the degree of vibration-damping of the arrangement of FIG. 7 can also be affected. Otherwise, the mode of operation of the arrangement of FIG. 7 corresponds to the mode of operation of the arrangements of FIG. 5 and FIG. 6. This is likewise a passive vibration-damping variant.

Figure 8:
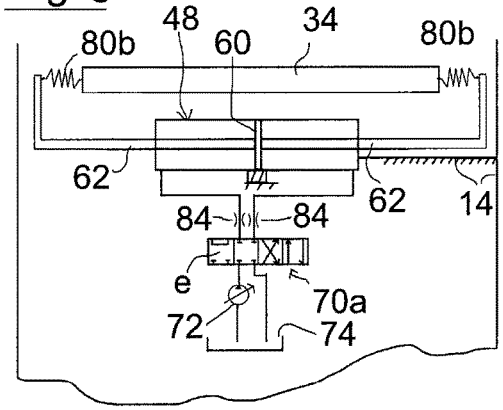

In the variant of FIG. 8, unlike in the variants of FIG. 5-7, the lateral push frame 34 is not coupled to the operator compartment frame 14 via springs, but instead there is a resilient coupling between the piston rods 62 and the lateral push frame 34. In the case of resilient coupling of this type (represented by the springs 80b), a symmetrical vibration return and damping effect is achieved irrespective of the current target position of the lateral push frame 34, since the two springs 80b do not have any fundamentally unequal biases and are thus always alternately loaded in a comparable manner by successive vibratory deflections. In FIG. 8, the synchronised cylinder 48 has the same hydraulic circuitry as the synchronised cylinder 48 in FIG. 5, in such a way that by switching on the valve portion e a vibration-damping mode can be set in which the cylinder chambers 64 are short-circuited or bypassed by way of the throttle points 84.

Numerous further variants on the vibration-damping between the lateral push frame 34 and the operator platform 12 are possible.

In particular, the controllable adjustment means 46 can also be used to damp vibrations actively, in that the vibratory deflections are detected by means of a sensor system, and a control means of the industrial truck generates data from the vibratory deflection data for actuating the controllable adjusting means 46 and controls the adjusting means 46 accordingly, in such a way that it actively counters the vibratory deflections by moving the piston 60.

To summarise, an industrial truck is proposed comprising:
a lifting frame (8),
an operator compartment (12) which can be moved upwards and downwards on the lifting frame (8),
a lateral push frame (34), which is arranged on the operator compartment (12), in the front thereof, and which can be moved upwards and downwards on the lifting frame (8) together with the operator compartment (12) and carries a load-receiving device (36), which can be moved back and forth laterally transversely to the straight forward travel direction (G) of the industrial truck, and
a vibration-damping means (48, 80, 84), which can be moved upwards and downwards on the lifting frame together with the operator compartment (12), for damping vibrations. the vibration-damping means (48, 80, 84) being arranged between the operator compartment (12) and the load-receiving device (36) and being set up to make vibration compensation movements of the load-receiving device (36) relative to the operator compartment (12) possible so as to damp or suppress vibrations. Preferably, an over-reach device for moving the lateral push frame (34) laterally transversely to the straight forward travel direction (G) of the industrial truck and relative to the operator compartment (12) is provided, and is designed to move the lateral push frame (34) along the lateral push frame guide (26), so as to increase the lateral movement range of the load-receiving device (36) relative to the operator compartment (12). In a particularly preferred embodiment of the invention, the vibration-damping means is combined with or integrated into the over-reach device.

The invention claimed is:

1. An industrial truck comprising:
a lifting frame,
an operator compartment which can be moved upwards and downwards on the lifting frame,
a lateral push frame, which is arranged on and in front of the operator compartment, and which can be moved upwards and downwards on the lifting frame together with the operator compartment and carries a load-receiving device, which can be moved back and forth laterally transversely to a straight forward travel direction of the industrial truck, and
a vibration-damping means, which can be moved upwards and downwards on the lifting frame together with the operator compartment, for damping vibrations,
wherein the vibration-damping means is arranged between the operator compartment and the load-receiving device and is designed to make vibration compensation movements of the load-receiving device relative to the operator compartment possible so as to damp or suppress vibrations.

2. The industrial truck according to claim 1, wherein the vibration-damping means is arranged between the operator compartment and the lateral push frame, and is designed to make shared vibration compensation movements of the load-receiving device and the lateral push frame relative to the operator compartment possible so as to damp or suppress vibrations.

3. The industrial truck according to claim 2, further comprising a lateral push frame guide, on which the lateral push frame is movably guided so as to perform vibration compensation movements laterally transversely in the straight forward travel direction of the industrial truck and relative to the operator compartment, wherein the lateral push frame guide is provided on the operator compartment.

4. The industrial truck according to claim 1, wherein the vibration-damping means comprises at least one resilient return element in a connection between the load-receiving device and the operator compartment.

5. The industrial truck according to claim 1, wherein the vibration-damping means further comprises at least one hydraulic, pneumatic or hydropneumatic shock absorber element in a connection between the load-receiving device and the operator compartment.

6. The industrial truck according to claim 5, wherein the shock absorber element is a cylinder, which comprises, in a cylinder housing, two cylinder chambers which are separated by a piston movable in the cylinder housing and which contain a fluid and are interconnected via a throttle point.

7. The industrial truck according to claim 1, wherein the vibration-damping means comprises at least one active hydraulic, pneumatic, hydropneumatic or electromotive vibration-damping member which can be controlled by a control means.

8. The industrial truck according to claim 1, further comprising an over-reach device for controlled lateral positioning of the lateral push frame transversely in the straight forward travel direction of the industrial truck and relative to the operator compartment, the over-reach device comprising a lateral push frame guide and a controllable adjustment device for moving the lateral push frame along the lateral push frame guide, the vibration-damping means being integrated into the over-reach device.

9. The industrial truck according to claim 8 wherein the controllable adjustment device comprises at least one adjustment member which can be controlled by a control means, wherein the control means is a hydraulic adjustment member, an electromotive adjustment member, or a hydropneumatic adjustment member, as drive means for moving the lateral push frame, the adjustment member being operable as a vibration-damping member in a vibration-damping mode of the over-reach device.

10. The industrial truck according to claim 9, wherein the controllable adjustment member is a double-action hydraulic synchronized cylinder between the operator compartment and the lateral push frame, the double-action hydraulic synchronized cylinder comprising, in a cylinder housing and two cylinder chambers separated by a piston movable in the cylinder housing and having at least one hydraulic connection for supplying and removing hydraulic fluid, the adjustment member being operable as an active and/or passive vibration-damping member.

11. The industrial truck according to claim 10, wherein the double-action hydraulic synchronized cylinder can be actuated in such a way that the cylinder chambers are interconnected via at least one hydraulic throttle point so as to set a passive vibration-damping mode.

12. The industrial truck according to claim 8, wherein at least one resilient return element is arranged in a connection between the lateral push frame and an adjusting means or in a connection between the adjusting means and the operator compartment in such a way that the resilient return element can counter vibratory deflections of the lateral push frame relative to the operator compartment.

13. The industrial truck according to claim 8, wherein at least one sensor is provided for detecting vibrations of the lateral push frame or the load-receiving device, wherein the at least one sensor can exchange data with a control means of a adjustment member of the over-reach device, and wherein the control means, in an active vibration-damping mode of the over-reach device, can control the adjustment member of the over-reach device based on measurement information from the at least one sensor in such a way that the adjustment member performs adjustment movements which counter any vibrations of the lateral push frame and/or the load-receiving device.

14. The industrial truck according to claim 13, wherein the at least one sensor is selected from the group consisting of the following sensors:
a strain gauge;
a piezoelectric element;
a fluid pressure sensor;
an acceleration sensor; and
a distance sensor.

15. The industrial truck according to claim 14, wherein the at least one sensor is arranged and designed so as to detect changes in position of the lateral push frame relative to the lateral push frame guide or to the operator compartment.

16. The industrial truck according to claim 8, wherein a plurality of sensors are in data transfer connection with a control means of an adjustment member of the over-reach device, wherein the control means is operable, in an active vibration-damping mode of the over-reach device, to control the adjustment member of the over-reach device as a function of measurement information from at least some of the sensors in such a way that the adjustment member performs adjusting movements which counter any vibrations of the lateral push frame, and wherein the sensors being designed to provide information concerning resilient material strains of the lifting frame, vibrations of the load-receiving device relative to the lateral push frame, a current travel speed of the industrial truck, a lifting height of the operator compartment, a lifting height of the load-receiving device relative to the operator compartment, or a mass of a load carried by the load-receiving device.

17. The industrial truck according to claim 5, wherein the shock absorber element is connected between the lateral push frame and the operator compartment.

18. The industrial truck according to claim 1, wherein the vibration-damping means comprises at least one resilient return element in a connection between the lateral push frame and the operator compartment and is arranged in such a way that it counters vibratory deflections of the load-receiving device or of the lateral push frame relative to the operator compartment.

19. The industrial truck according to claim 4, wherein the at least one resilient return element is arranged in such a way that it can counter vibratory deflections of the load-receiving device and of the lateral push frame relative to the operator compartment.

20. The industrial truck according to claim 12, wherein the at least one resilient return element is arranged in connection between the lateral push frame and the adjusting means and in a connection between the adjusting means and the operator compartment.

* * * * *